March 23, 1937. A. G. GRANT 2,074,389
SNOWMOBILE
Filed Feb. 21, 1935 2 Sheets-Sheet 1
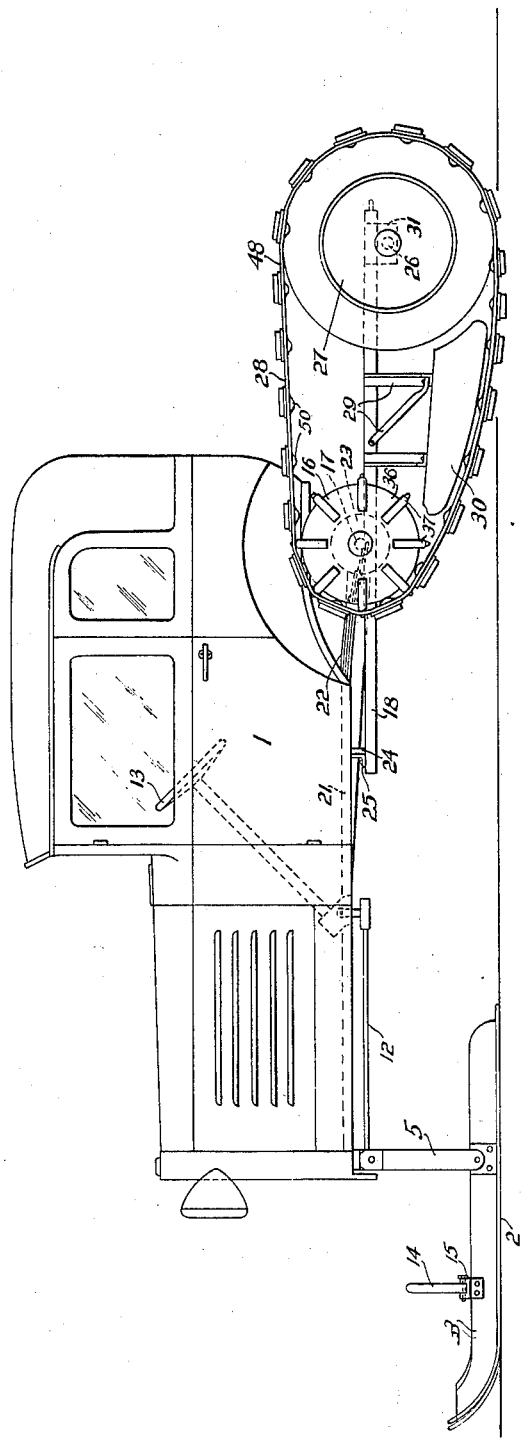
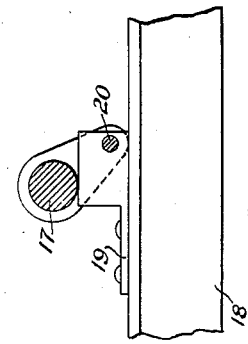
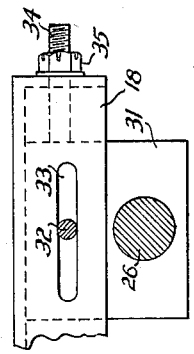
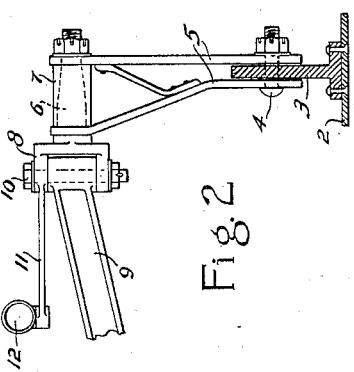
INVENTOR:
ARTHUR GREY GRANT
BY
ATTORNEY March 23, 1937. A. G. GRANT 2,074,389
SNOWMOBILE
Filed Feb. 21, 1935 2 Sheets-Sheet 2
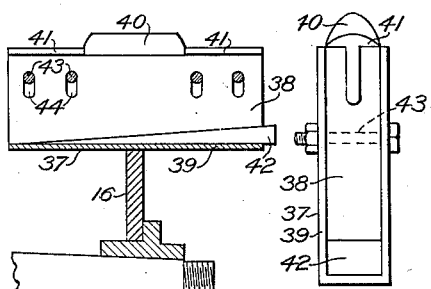
Fig. 5 Fig. 6
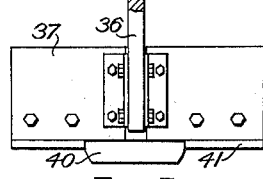
Fig. 7
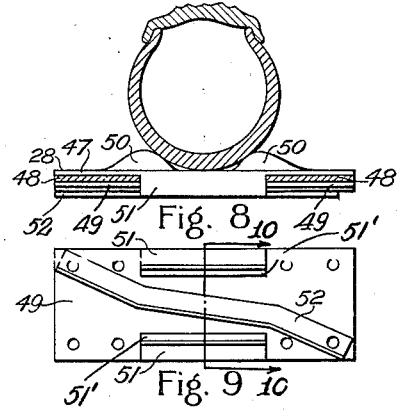
Fig. 8
Fig. 9
Fig. 10
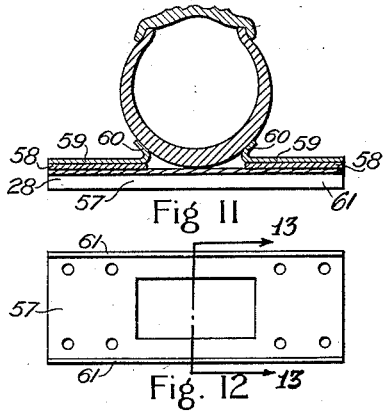
Fig 11
Fig. 12
Fig. 13
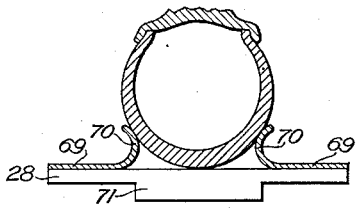
Fig. 14
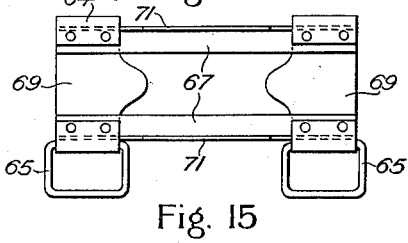
Fig. 15
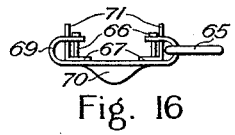
Fig. 16
INVENTOR:
ARTHUR GREY GRANT
By Alex. E. MacRae
Attorney Patented Mar. 23, 1937

2,074,389

UNITED STATES PATENT OFFICE 2,074,389

SNOWMOBILE

Arthur Grey Grant, New Liskeard, Ontario, Canada

Application February 21, 1935, Serial No. 7,566
In Canada March 5, 1934

1 Claim. (Cl. 180—5)

This invention relates to snowmobiles and has for its object to provide an improved arrangement which can be produced inexpensively by making a few relatively simple changes in an ordinary automobile or truck.

The invention can be readily carried into effect by converting an automobile into a snowmobile of the improved construction. The improved snowmobile may be driven in the same manner as an automobile, but may be safely and satisfactorily driven over snow-covered ground which could not be negotiated by an automobile.

The invention consists in the construction, combination and arrangement of parts hereinafter fully described and more particularly pointed out in the appended claims.

Referring now to the accompanying drawings, which illustrate, by way of example, one convenient embodiment of the invention,—

Figure 1 is a side elevation;

Figure 2 is a front elevation, partly in section, of one of the runners and its connection to the front axle;

Figure 3 is a fragmentary view showing idler axle adjusting means;

Figure 4 is a fragmentary side elevation of the means employed for attaching the beams to the rear axle;

Figure 5 is a sectional view of the driving gear;

Figure 6 is an end elevation of a driving gear tooth;

Figure 7 is an end elevation of another embodiment of driving gear tooth;

Figure 8 is a cross-section of one embodiment of a traction chain link positioned on the tire;

Figure 9 is a plan of the lower surface of the link shown in Figure 8;

Figure 10 is a section on line 10—10 of Figure 9;

Figure 11 is a cross-section of a further embodiment of a traction chain link;

Figure 12 is a plan of the lower surface of the link shown in Figure 11;

Figure 13 is a section on line 13—13 of Figure 12;

Figure 14 is a cross-section of a further embodiment of a traction chain link;

Figure 15 is a plan of the lower surface of the link shown in Figure 14; and

Figure 16 is an end elevation of the link shown in Figure 15.

The preferred form of the invention comprises an automobile 1, from which the front and rear wheels have been removed. A pair of runners 2 are provided in place of the front wheels, for example, as indicated in Figures 1 and 2. The web 3 of each runner is in this case pivotally connected by a bolt 4 to the lower ends of a pair of plates 5, the upper ends of which are provided with holes to receive the front wheel spindle 6, a spacer sleeve 7 preferably being provided between the plates 5. The steering knuckle 8 is pivotally connected to the front axle 9 by a bolt 10 and is provided with an arm 11 pivoted to a steering rod 12 connected with the steering wheel 13, all in the usual manner.

The runners 2 may be provided with a tie rod 14 connected to the webs 3 as by universal joints 15.

Driving gears 16 are rigidly mounted on the automobile rear axle 17 in place of the ordinary rear wheels.

A beam 18 of angle or other suitable section is attached to the underside of the rear axle 17 adjacent each end of the axle. The beams may be attached to the axle by any suitable means such as that shown in Figure 4, in which a plate 19 secured to the beam is attached to the axle by means of the original snubber bolt 20 passing through a flange in the plate 19. The axle 17 is, of course, connected to the usual automobile frame 21 by springs, such as 22, and is driven through a differential gear 23 in the customary manner.

The front ends of the beams 18 extend to the cross member 24 of the frame 21 and are bolted thereto by means of the angle members 25.

The beams are extended rearwardly of the axle 17 and mounted on the rear ends thereof is an axle 26 on which are mounted wheels 27, which may be the original front or rear wheels of the automobile.

Traction chains 28 connect the wheels 27 with the driving gears 16.

Suspended from the beams 18 by means of supports 29 are runners 30, preferably of wood, positioned between the wheels 27 and driving gears 16 and adapted to hold the chains 28 in position. It will be noted that the runners 30 impart to the bottom outline of the chains 28 the shape of a sleigh runner. Means may be provided, if necessary, for adjusting the runners vertically to compensate for wear thereof or to alter the position of the same.

The axle 26 may be mounted in any suitable manner on the beams 18 but preferably so that the tension of the chains 28 can be readily adjusted. For example, the axle 26 may be formed with, or secured to, blocks 31, which are slidably secured to the beams 18 by means of clamp bolts 32 cooperating with slots 33 in the beams.

Each block 31 may be formed with a screw-threaded stem 34 passing through a hole in a flange at the end of the beam. The position of the blocks 31 and axle 26, and, therefore, the tension of the chains 28, can be easily adjusted by rotating a nut 35 and locking the same in adjusted position as shown in Figure 3.

The original brakes of the automobile may be mounted on the wheels 27 and the ordinary brake operating cables or rods lengthened for actuation thereof.

The driving gears 16 consists of a disc 36 on the circumference of which are mounted a series of teeth 37 of suitable form. As shown in Figures 5 and 6, the teeth 37 consist of a wooden core 38 in a metal casing 39. Each tooth 37 is provided with an outwardly extending projection 40. Copper strips 41 may be secured to the outer surfaces of the tooth to prevent sticking of snow thereto. Means may be provided for adjusting the tooth to take up wear thereon and, as shown, comprises a key 42, pressure on which will effect an outward movement of the tooth. The tooth may be held securely in place by means of clamp bolts 43 cooperating with slots 44 in the tooth.

A further embodiment of the tooth is shown in Figure 7 and comprises a rubber covering 45 vulcanized to a steel core 46.

The embodiment of the traction chain 28 shown in Figures 8, 9 and 10 comprises a series of plates 47 connected to two strips 48 of suitable belting, for instance, transmission rubber belting, by means of pins or rivets passing through the same and secured to supporting plates 49 on the other side of the belting. The plates 47 are provided with raised portions 50 to position the tire, which is illustrated in Figure 8, on the plate and firmly secure the chain 28 in place thereon. The plates 47 are also provided with bent-in flanges 51 for traction purposes and sections of rubber hose 51' or similar material may be placed adjacent the flanges 51 to prevent snow accumulation thereabout. A strip of angle iron 52 may be positioned diagonally across the plates 47, as shown, to provide additional traction.

In the embodiment shown in Figures 11, 12 and 13 the plates 57, connected to strips of belting 58 are provided with vertical flanges 61 extending the length of the plates. Apertures 63 may be provided in the plates 57 to prevent snow accumulation thereon. In this embodiment, the supporting plates 59 are provided with tire-positioning raised portions 60, a tire being illustrated in Figure 11 in relation thereto.

In the embodiment shown in Figures 14, 15 and 16, the chain 28 is composed of a series of sections 64 linked together by means of links 65. Each section 64 comprises two angle members 67 provided with projecting flanges 71 and connected to each other by means of the supporting members 69, to which the members 67 are attached by pins or rivets 66. Tire-positioning portions 70 are provided as before on the members 69, Figure 14, showing the relative position of a tire thereon.

It will readily be apparent that the driving gears 16 are adapted for engagement with the traction chains 28 to drive the same.

It has been found that a snowmobile constructed in the manner described can be driven easily and satisfactorily under practically any snow conditions.

An important feature of the invention resides in the traction means for propelling the vehicle and the contour imparted to the traction chains particularly by means of the runners 30. It will be noted that when the snowmobile is travelling on a well-packed road, there is a relatively small contact between the chain and the road, resulting in less power being required to drive the vehicle and greatly facilitating the steering thereof. There is of course very little friction on the runners 30 when driving on packed roads. In deeper snow, more traction is required and the chain has then a much greater contact therewith and since its shape simulates that of a sleigh runner, there is a tendency for the vehicle to climb or remain on top of the snow.

While several embodiments of various details of the invention have been shown and described, it will be apparent that such details may be changed in a variety of ways to adapt the invention to any design of automobile or truck without departing from the scope of the invention as defined in the appended claim.

I claim:

A traction attachment for automobiles comprising, in combination with the rear driving axle of the automobile, beams extending longitudinally of the automobile, and rearwardly of said driving axle, a supplementary axle mounted adjacent the rear ends of said beams and in substantially the same plane as said driving axle, wheels forming the sole supporting means for the rear of the automobile journalled on said supplementary axle, driving gears of smaller diameter than said wheels mounted on said driving axle in place of the ordinary rear wheels, traction chains circumferentially engaging said gears and wheels and having a normal line of travel between said gears and wheels governed only thereby whereby the lower normal line of travel between the gears and wheels is in an inclined direction, and traction chain contacting members suspended from said beams and adapted to prevent distortion of said chains from their lower normal line of travel between said gears and wheels.

ARTHUR GREY GRANT.